(12) United States Patent
Wiedenman et al.

(10) Patent No.: US 7,003,628 B1
(45) Date of Patent: Feb. 21, 2006

(54) BUFFERED TRANSFER OF DATA BLOCKS BETWEEN MEMORY AND PROCESSORS INDEPENDENT OF THE ORDER OF ALLOCATION OF LOCATIONS IN THE BUFFER

(75) Inventors: Gregory B. Wiedenman, Woodbury, MN (US); Nathan A.. Eckel, Fridley, MN (US); Raymond G. Ryan, Robbinsdale, MN (US)

(73) Assignee: Unisys Corporation, Blue Bell, PA (US)

( * ) Notice: Subject to any disclaimer, the term of this patent is extended or adjusted under 35 U.S.C. 154(b) by 452 days.

(21) Appl. No.: 10/330,982

(22) Filed: Dec. 27, 2002

(51) Int. Cl.
*G06F 12/00* (2006.01)
(52) U.S. Cl. .................. 711/118; 711/147; 711/154; 711/156; 711/170
(58) Field of Classification Search ............ 711/118, 711/147, 154, 156, 170
See application file for complete search history.

(56) References Cited

U.S. PATENT DOCUMENTS

| | | | | |
|---|---|---|---|---|
| 4,334,287 A | * | 6/1982 | Wiedenman et al. | 710/36 |
| 4,794,521 A | * | 12/1988 | Ziegler et al. | 711/130 |
| 6,061,765 A | * | 5/2000 | Van Doren et al. | 711/145 |
| 6,078,994 A | * | 6/2000 | Carey | 711/133 |
| 6,237,066 B1 | * | 5/2001 | Pan et al. | 711/149 |
| 6,574,720 B1 | * | 6/2003 | Hopeman et al. | 711/170 |

* cited by examiner

*Primary Examiner*—Stephen C. Elmore
(74) *Attorney, Agent, or Firm*—Charles A. Johnson; Mark T. Starr; Crawford Maunu PLLC

(57) ABSTRACT

A data transfer system uses a data buffer and individual control of each storage location within the data buffer for improved control of data block transfers. The storage locations are assigned deallocate, active, or valid assignment bands to enable transfer control of the data blocks within the system. The deallocated storage locations are returned to an allocation pool for use as a future resource, where the active and valid assignment bands remain unavailable until deallocated. Error checking and depth control prohibit consecutive allocation or deallocation assignments as well as overflow.

17 Claims, 8 Drawing Sheets

BUFFERED TRANSFER OF DATA BLOCKS BETWEEN MEMORY AND PROCESSORS INDEPENDENT OF THE ORDER OF ALLOCATION OF LOCATIONS IN THE BUFFER

FIELD OF THE INVENTION

The present invention relates in general to buffer control, and more particularly, to buffer control which facilitates data block transfer independently of the position of the data blocks within the buffer.

BACKGROUND OF THE INVENTION

Today's computing architectures are designed to provide the sophisticated computer user with increased Reliability, Availability, and Scalability (RAS). To that end, the rise of the Microsoft Windows NT/2000 operating environment has presented a relatively low cost solution to the traditional high-end computing environment. The introduction of the Enterprise Edition has extended the scalability and resilience of the NT Server to provide a powerful and attractive solution to today's largest and most mission critical applications.

The Cellular MultiProcessing (CMP) architecture is a software/hardware environment that is developing as the enabling architecture that allows the Windows NT/2000 based servers to perform in such mission critical solutions. The CMP architecture incorporates high performance Intel processors using special hardware and middleware components that build on standard interface components to expand the capabilities of the Microsoft Windows server operating systems. The CMP architecture utilizes a Symmetric MultiProcessor (SMP) design, which employs multiple processors supported by high throughput memory, Input/Output (IO) systems and supporting hardware elements to bring about the manageability and resilience required for enterprise class servers.

Key to the CMP architecture is its ability to provide multiple, independent partitions, each with their own physical resources and operating system. Partitioning requires the flexibility required to support various application environments with increased control and greater resilience. Multiple server applications can be integrated into a single platform with improved performance, superior integration and lower costs to manage.

The objectives of the CMP architecture are multifold and may consist at least of the following: 1.) to provide scaling of applications beyond what is normally possible when running Microsoft Windows server operating systems on an SMP system; 2.) to improve the performance, reliability and manageability of a multiple application node by consolidating them on a single, multi-partition system; 3.) to establish new levels of RAS for open servers in support of mission critical applications; and 4.) to provide new levels of interoperability between operating systems through advanced, shared memory techniques.

The concept of multiprocessors sharing the workload in a computer relies heavily on shared memory. True SMP requires each processor to have access to the same physical memory, generally through the same system bus. When all processors share a single image of the memory space, that memory is said to be coherent, where data retrieved by each processor from the same memory address is going to be the same. Coherence is threatened, however, by the widespread use of onboard, high speed cache memory. When a processor reads data from a system memory location, it stores that data in high speed cache. A successive read from the same system memory address results instead, in a read from the cache, in order to provide an improvement in access speed. Likewise, writes to the same system memory address results instead to writes to the cache, which ultimately leads to data incoherence. As each processor maintains its own copy of system level memory within its cache, subsequent data writes cause the memory in each cache to diverge.

A common method of solving the problem of memory coherence in SMP dedicated cache systems is through bus snooping. A processor monitors the address bus for memory addresses placed on it by other processors. If the memory address corresponds to an address whose contents were previously cached by any other processor, then the cache contents relating to that address are marked as a cache fault for all processors on the next read of that address, subsequently forcing a read of system memory. One major difficulty, however, in a multi-processor environment, is overloading the memory bus through the use of bus snooping, which results in a scalability limitation.

Another problem existing within SMP systems is the concept of data management between the multiple processors and their corresponding shared memory pool. Traditional methods of data transfer utilized First-In, First-Out (FIFO) buffers to temporarily store data until a particular processor or memory pool required the data. In an SMP environment, however, the distinct possibility exists that data required by one processor is blocked by the FIFO because other data preceding is not ready for transfer, thus blocking data transfer to the processor and thus slowing operation.

A need exists, therefore, to provide a non-blocking data management system and corresponding data management control to allow fully, non-blocking data transfer to exist and ultimately increase efficiency.

SUMMARY OF THE INVENTION

The present invention is directed to a method and apparatus for controlling access to a non-blocking buffer. One of three assignment bands are associated with each storage location within the non-blocking buffer to restrict read and write access. Individual read and write pointers are used to independently control data written to and data read from the non-blocking buffer.

In accordance with one embodiment of the invention, a method for controlling data block transfers is presented. The method comprises maintaining a pool of available storage locations within a buffer, allocating a storage location from the pool in response to a pending data block transfer, transferring a data block into the allocated storage location, and retrieving the data block from the allocated storage location, wherein retrieving the data block is independent of the position of the storage location within the buffer.

In accordance with another embodiment of the invention, a multiprocessor system is presented. The multiprocessor system comprises a plurality of multiprocessors sharing a common system bus with access to a common memory pool and a node controller coupled to each of the plurality of multiprocessors. The node controller comprises a plurality of buffers coupled to receive data blocks and coupled to provide the data blocks independently of a position of the data blocks within the plurality of buffers, and a buffer tracker coupled to the plurality of buffers to control data block transfer according to assignment bands associated with the data blocks.

In accordance with another embodiment of the invention, a method of maintaining an assignment band of a data block within a buffer to control access to the data block is presented. The method comprises establishing a first assignment band for the data block in response to receiving an allocation request, establishing a second assignment band for the data block when data is written to the data block in accordance with a first data pointer, and establishing a third assignment band for the data block when data is read from the data block in accordance with a second data pointer.

The above summary of the present invention is not intended to describe each illustrated embodiment or implementation of the present invention. This is the purpose of the figures and the associated discussion which follows.

DETAILED DESCRIPTION

Figure 1:
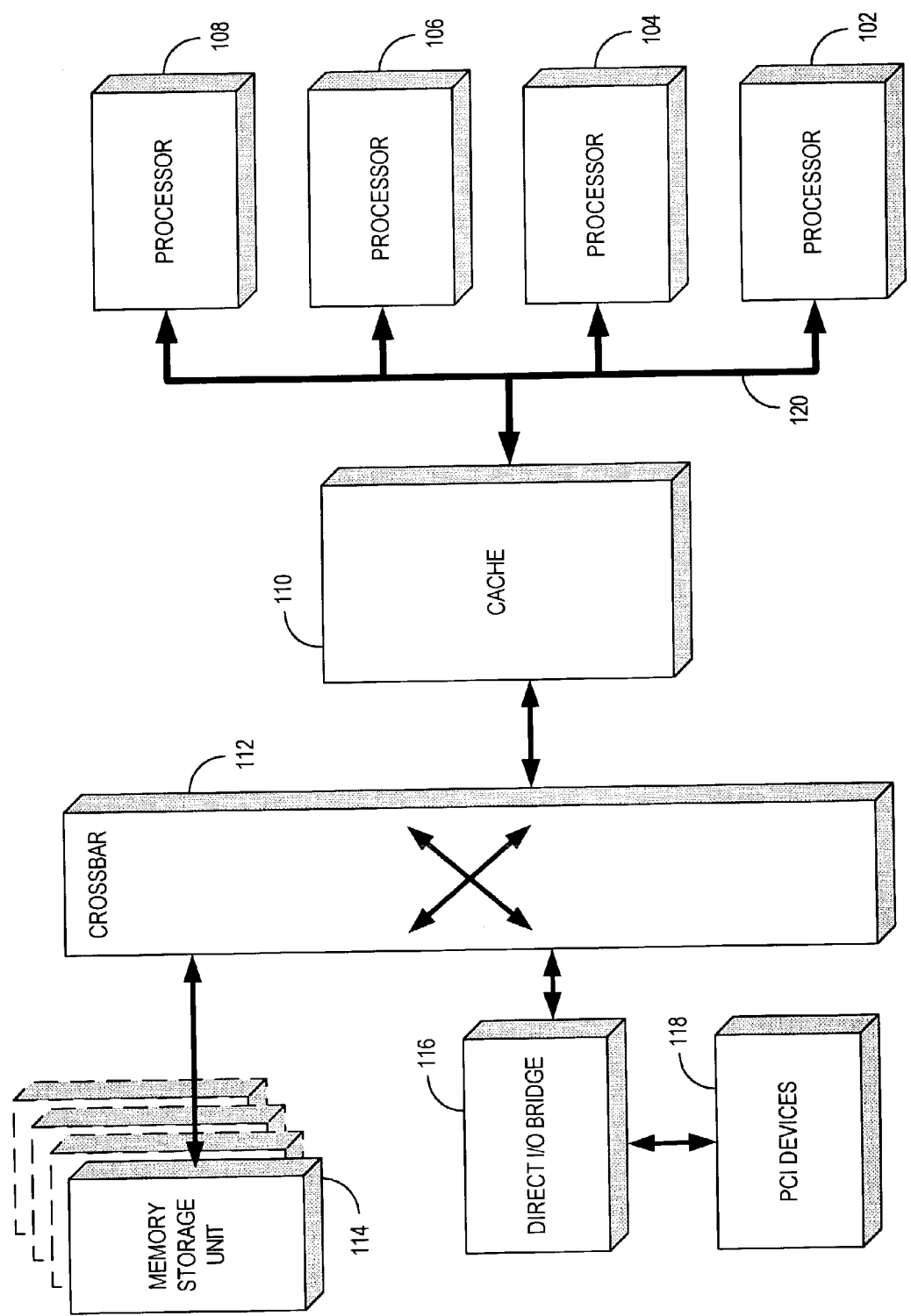
FIG. 1 illustrates a block diagram of a processing cell in accordance with the present invention.

FIG. 1 illustrates an exemplary block diagram of a processing cell in accordance with the present invention. A typical processing cell, or sub-pod, is comprised of multiple Central Processing Units 102–108 and a corresponding Cache 110. The processing units may be of the 128 bit McKinley processor family as produced by Intel Corp., the 64-bit, IA-64 Itanium family, also produced by Intel Corp., or may, for example, be of the 32-bit, Xeon processing family, also produced by Intel Corp. Each of processors 102–108 share Cache 110 through bus 120, where bus 120 may serve up to, for example, four processors 102–108. Memory Storage Units 114 provides a shared memory pool for Processors 102–108 through non-blocking cross-bar 112. Direct IO Bridge 116 provides high-throughput access to Peripheral Component Interconnect devices 118. It should be noted that the present invention is not limited for use with only those processors listed above, but may be used with any processor that is compatible within a multi-processing environment.

Memory Storage Unit 114 may consist of up to four main memory banks each of which may contain a maximum of 16 GigaBytes of Random Access Memory. Likewise, Cache 110 may comprise up to four banks of cache (not shown), each cache bank may contain up to 32 MegaByte of RAM, which is on the order of five times faster than Memory Storage Unit 114 RAM. Each cache bank has a dedicated, direct connection to each of Memory Storage Units 114, each direct connection being supported by crossbar 112. Memory Storage Unit 114 has a typical mainframe design, such that each Memory Storage Unit 114 may handle hundreds of access requests concurrently. Even higher performance may be realized by allowing interleaving between each Memory Storage Unit 114. When interleaving is enabled, data may be spread across all Memory Storage Units 114 and may be accessed in parallel by any one of Processors 102–108 and/or Cache 110. Crossbar 112 allows for fast, consistently low latency, high bandwidth transmissions between cache 110 and IO bridge 116.

Multiple sub-pods, like the sub-pod illustrated in FIG. 1, may be combined to provide a highly scalable solution for today's demanding enterprise environments in accordance with the present invention. A single configuration of multiple sub-pods, for example, may include a total of 32 processors, along with eight cache modules, 64 GB of main memory, four cross-bars and eight direct I/O bridges to support a total of 96 PCI slots.

Figure 2:
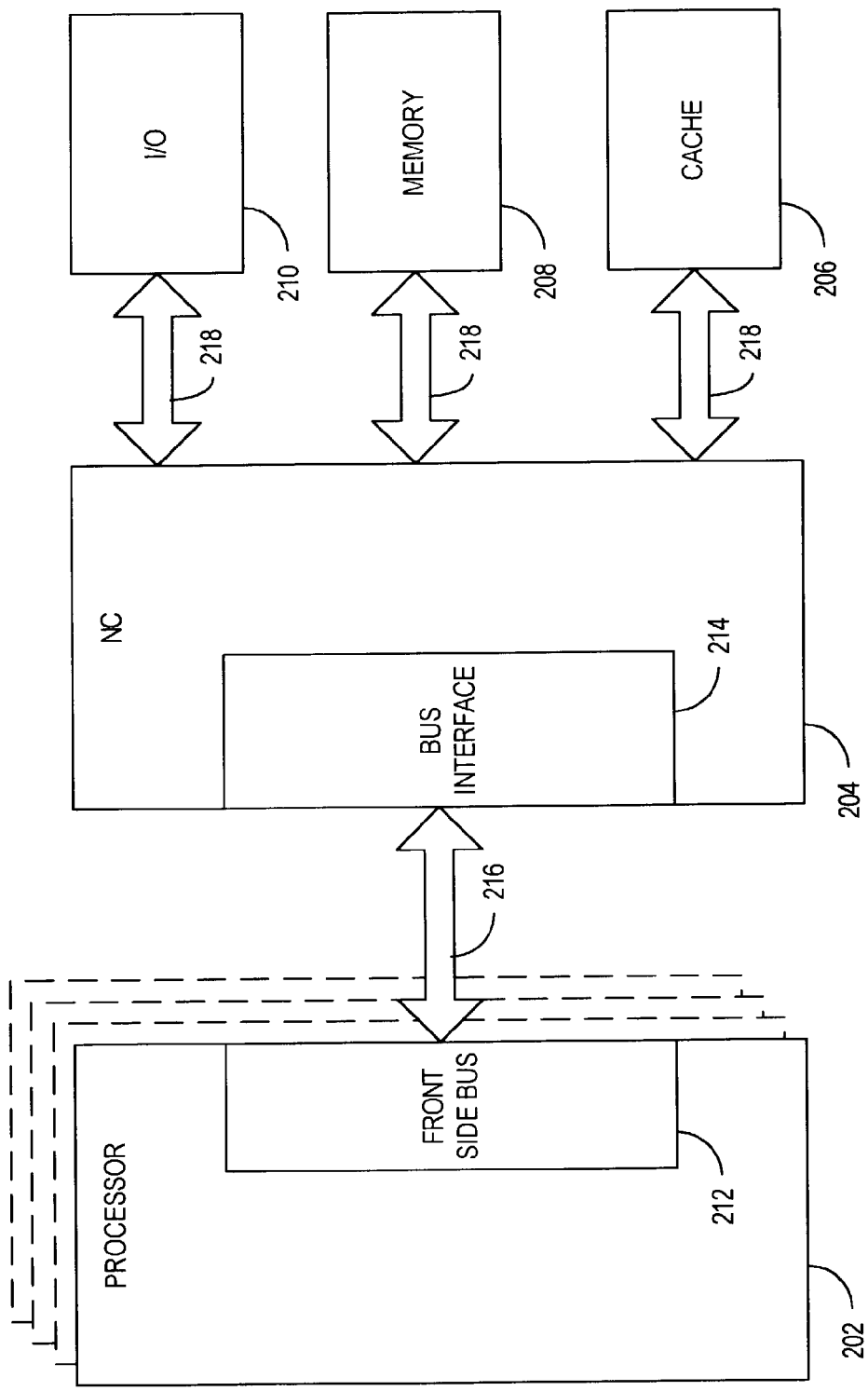
FIG. 2 illustrates a block diagram of the bus interaction of the processing cell of FIG. 1.

FIG. 2 illustrates an exemplary block diagram illustrating bus components within Processors 202 and the associated bus controller required to negotiate bus access by Processors 202 to I/O 210, Memory 208, and Cache 206. Processors 202 each contain Front Side Bus (FSB) 212. Node Controller 204 provides the processor system Bus Interface 214 and cache controller chip for up to four Processors 202 operating on common system bus 216. NC 204 resides on the sub-pod module and is the central agent on the processor system bus to allow interactions between Processors 202, Cache 206, Memory 208, and I/O 210.

NC 204 facilitates access to cache 206 providing quick access to commonly used cache lines that are requested on system bus 216. The data portion of Cache 206 resides in Static RAM (SRAM) that is external to Node Controller 204 and a corresponding on-chip tag RAM keeps track of state and control information for the resident cache lines. In operation, copies of frequently accessed state and control information, called cache blocks or cache lines, are maintained in the SRAM portion of Cache 206. Each cache block or line is marked with a block address, referred to as a tag, so that Cache 206 knows to which part of the SRAM memory space the cache line belongs. The collection of cache tags for each memory block contained within the SRAM is contained within the on-chip tag RAM. For example, if cache line $B_j$ containing data entries $D_j$ is assigned to a portion of SRAM called $M_1$, then $B_j$ is in the on-chip tag RAM and $D_j$ is contained within the SRAM of Cache 206. Cache 206 is a non-inclusive cache, meaning that not all cache lines resident in the processor's cache are necessarily resident within Cache 206.

In operation, Node Controller 204 decodes Front Side Bus 212 transactions on system bus 216 into two main types: 1.) coherent memory requests; and 2.) non-coherent requests. Coherent memory requests are controlled under the MESI protocol throughout the system and Cache 206. Memory within a multiprocessor system in which every memory read and every memory write is instantly known by each processor within the system is known as coherent memory. Coherent memory requests, therefore, must communicate the memory accessed by one processor to the other processors on the bus through the use of a bus snooping function, so that stale data is not used. Coherent memory requests on System Bus 216 are monitored by the bus snooping function and communicated to all Processors 202 on System Bus 216. The non-coherent requests, on the other hand, correspond to requests such as memory-mapped I/O, interrupts, and other special transactions which do not use Cache 206.

Communication between Node Controller 204, I/O 210, Memory 208 and Cache 206 is conducted via interface 218, which is implemented using a crossbar similar to the crossbar discussed in relation to FIG. 1. The crossbar is a multi-input, multi-output, non-blocking electronic switch, where access from Node Controller 204 and external components is unimpeded, thus removing any potential bottlenecks. The number of Processors 202 operating in conjunction with Node Controller 204 is advantageously limited in order to avoid excessive bus contention on System Bus 216, especially in consideration of the bus snooping function as discussed above.

Data transfer on System Bus 216 may be implemented on varying width buses to include 32, 64 and 128 bit buses and beyond. The clocking rate on bus 216 is usually in the range of several hundred MegaHertz (MHz) and data may be transferred on both the rising and falling edges for double-pumped operation of the system bus clock to achieve an effective System Bus 216 bandwidth of several GigaHertz (GHz). In addition, varying phases of the system bus clock may be used to implement even higher effective bus clock rates, such as providing two rising edges and two falling edges within a clock period for a quad-pumped operation of the system bus clock. Processors 202 are responsible for obeying any bus specification that may exist for System Bus 216 between Front Side Bus 212 and Bus Interface 214.

Bus Interface 214 interfaces Node Controller 204 to Front Side Bus 212 for each of Processors 202. Bus Interface 214 provides at least the following functions: 1.) a request queue that allows Node Controller 204 or Processors 202 to generate bus requests; 2.) an in-order queue to receive bus requests from processors 202; 3.) a snoop interface to provide address and function information necessary to snoop Node Controller 204 tag RAM and then to provide the tag status to the snoop interface; 4.) response cycle generation to complete bus operations; 5.) generation of deferred phase operations; and 6.) a data transfer interface to provide the control and necessary data queues to transfer data bus reads, writes, interrupts and special transactions.

Figure 3:
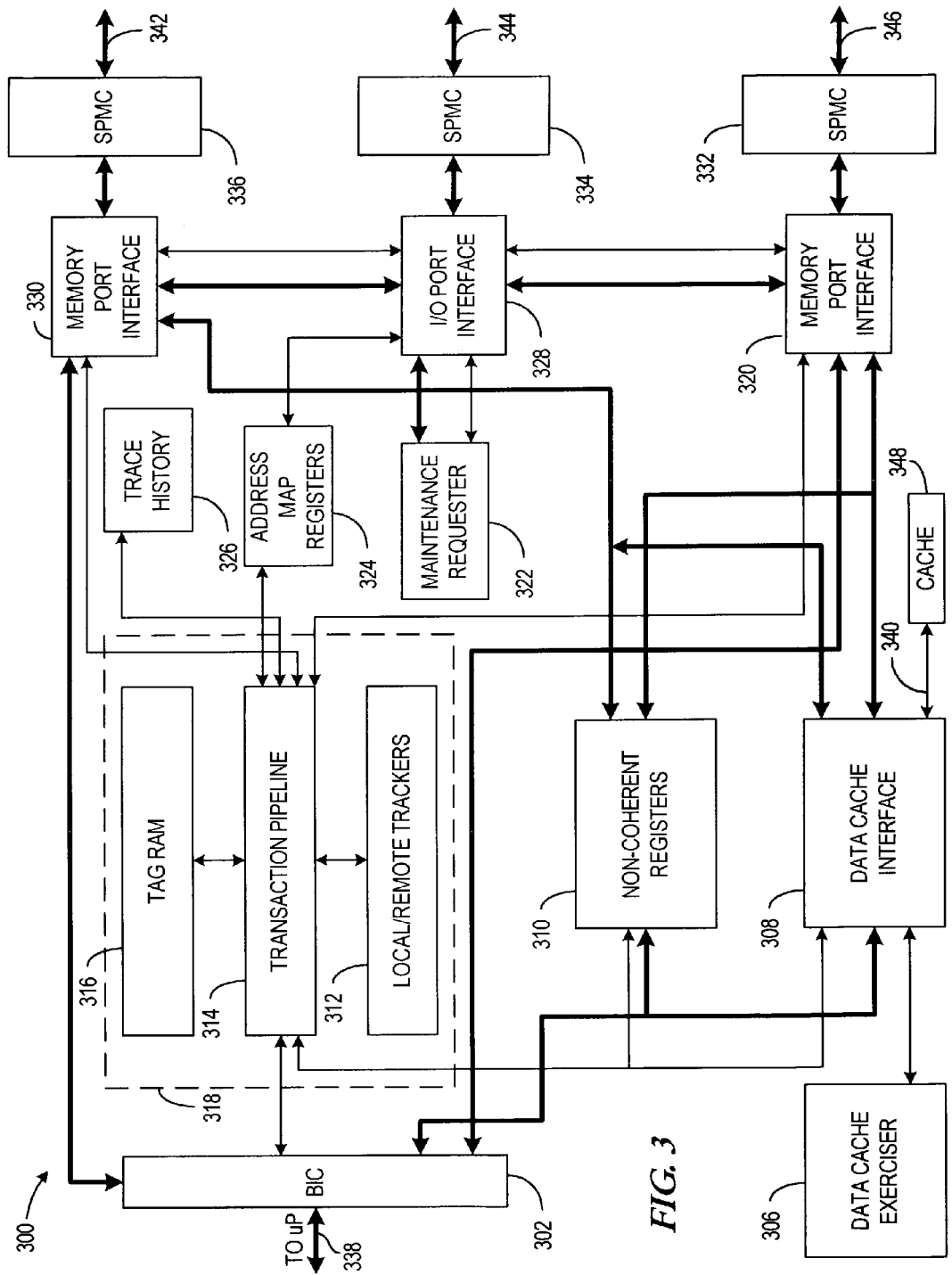
FIG. 3 illustrates a block diagram of a node controller in accordance with the present invention.

FIG. 3 illustrates an exemplary block diagram of Node Controller 300 in accordance with the principles of the present invention and is interconnected as follows. Bus Interface Controller 302 connects to System Bus 338, which is the system bus for the processors attached to the particular sub-pod of interest. Bus Interface Controller 302 interconnects through a data bus to Memory Port Interfaces 320 and 330 as well as to Data Cache Interface 308. Transaction Processor 318 is comprised of Tag RAM 316, Transaction Pipeline 314 and Local/Remote Trackers 312. Tag RAM 316, Transaction Pipeline 314 and Local/Remote Trackers 312 are each interconnected through a control bus and Transaction Pipeline 314 is interconnected to Bus Interface Controller 302 through a control bus. Transaction Pipeline 314 also provides control through a control bus to Address Map Registers 324, Trace History 326, Memory Port Interfaces 330 and 320. A data bus interconnects Bus Interface Controller 302 and Non-Coherent Registers 310 and Data Cache Interface 308. A data bus also interconnects Non-Coherent Registers 310 and Data Cache Interface 308 to Memory Port Interfaces 320 and 330. Data Cache Interface 308 is interconnected to cache 348 that may be separately located, e.g. off-chip, from Data Cache Interface 308. Maintenance Requestor 322 and I/O Port Interface 328 are interconnected by both a data bus and a control bus. A control bus interconnects Address Map Registers 324 to I/O Port Interface 328. Data and control bus interfaces exist between I/O Port Interface 328 and Memory Port Interfaces 320 and 330. Scalability Port Memory Controllers 332, 334, and 336 interconnect through a data bus to Memory Port Interface 320, I/O Port Interface 328, and Memory Port Interface 330, respectively. Data buses 342 and 346 interconnect Scalability Port Memory Controllers 336 and 332, respectively, to the respective Memory Storage Unit associated with the particular sub-pod assembly. It should be noted that dual data buses 342 and 346 are provided to Node Controller 204 to allow for fault tolerant functionality, parallel processing, etc. Scalability Port Memory Controllers 344 transfer data between I/O Port Interface 328 and PCI devices 118 as depicted in FIG. 1 and I/O devices 210 as depicted in FIG. 2.

In operation, Node Controller 300 provides all the necessary functions required to facilitate processor bus operations on Bus Interface 338. In particular, Node Controller 300 facilitates at least seven primary functions: 1.) Out-Going Queue for outgoing requests to be sent out to Bus Interface Controller 302; 2.) In-Order Queue for incoming requests from Bus Interface Controller 302; 3.) Response Control for all bus requests; 4.) Datapath for data transfer and control between Memory Storage Units; 5.) I/O interface module to facilitate access to PCI devices; 6.) History Stack for Bus Interface Controller 302 history capture; and 7.) Error Checking to collect and check all errors. The other major interfaces accommodated by Node Controller 300 include the Bus Interface Controller 302 to Transaction Pipeline 314 interface which handles control signals and address/function signals, data transfers between Bus Interface Controller 302 and Data Cache Interface 308, data transfers between Bus Interface Controller 302 and Memory Storage Unit 0 (not shown) on interface 342, data transfers between Bus Interface Controller 302 and Memory Storage Unit 1 on interface 346 and non-coherent data transfers between Bus Interface Controller 302 and Non-Coherent Registers 310.

The Out-Going Queue function receives requests to be sent to Bus Interface Controller 302 from either Transaction Pipeline 314, Memory Port Interface 330, or Memory Port Interface 320. The requests are individually strobed into a priority selection block which acknowledges and grants execution of the request according to a prioritized selection algorithm, or held for later processing within the Out-Going Request Queue. Each of the requesting entities places information concerning the request type, which may be represented by a 3–5 bit digital code identifying one of a number of possible request types. Likewise, an In-Order Queue is utilized to store requests received from the processor on Bus Interface Controller 302 pertaining to, for example, snoop requests or write transactions sent from the processor.

The request signals comprise, for example, an active low address field used to identify the recipient of the request as well as a parity field to maintain an even number of active low signals on the address bus. Likewise, the request field is maintained with even parity by an associated request parity bit. The lower three bits of the address field are mapped into byte enable signals, which allows for a programmable number of bytes to be transferred in a given transaction. The programmable number of bytes for transfer in a single clock transition is, for example, 0 to 8 bytes.

Response signals are generated in response to the requests received and provide status for the requests that have been received. Each response signal comprises a response status field, whose parity is held even by a response parity field. Additionally, a Target Ready bit is maintained within the response signal to allow the receiving party to signal its readiness for write data or writeback data, if a data write is appropriate for the particular request. For transactions with an implicit writeback, the Target Ready bit is asserted twice, first for the write data transfer and second for the implicit writeback data transfer.

Data response signals control the transfers of data on Bus Interface 338. The agent responsible for transferring data on the data bus is responsible for indicating that data on the bus is valid and that the data should be latched. The data bus agent, for example, should assert a ready bit at both the rising edge and falling edge of the bus clock for double-pumped operation. Additionally, the ready bit may be deasserted by the transmitting entity in order to insert wait states into the data phase. Bus Interface 338 may represent, for example, a 32, 64, or 128 bit width and may be enabled for individual bytes within Bus Interface 338. For example, if Bus Interface 338 is 64 bits wide, then the bus is capable of transferring 8 bytes of data at a time, where each byte equals 8 bits. A 3-bit byte enable field, for example, could then be used to provide information as to which bytes of data are valid on the 64-bit bus. Additionally, the data transferred on Bus Interface 338 may be Error Correction Coded regardless of which bytes are enabled.

Figure 4:
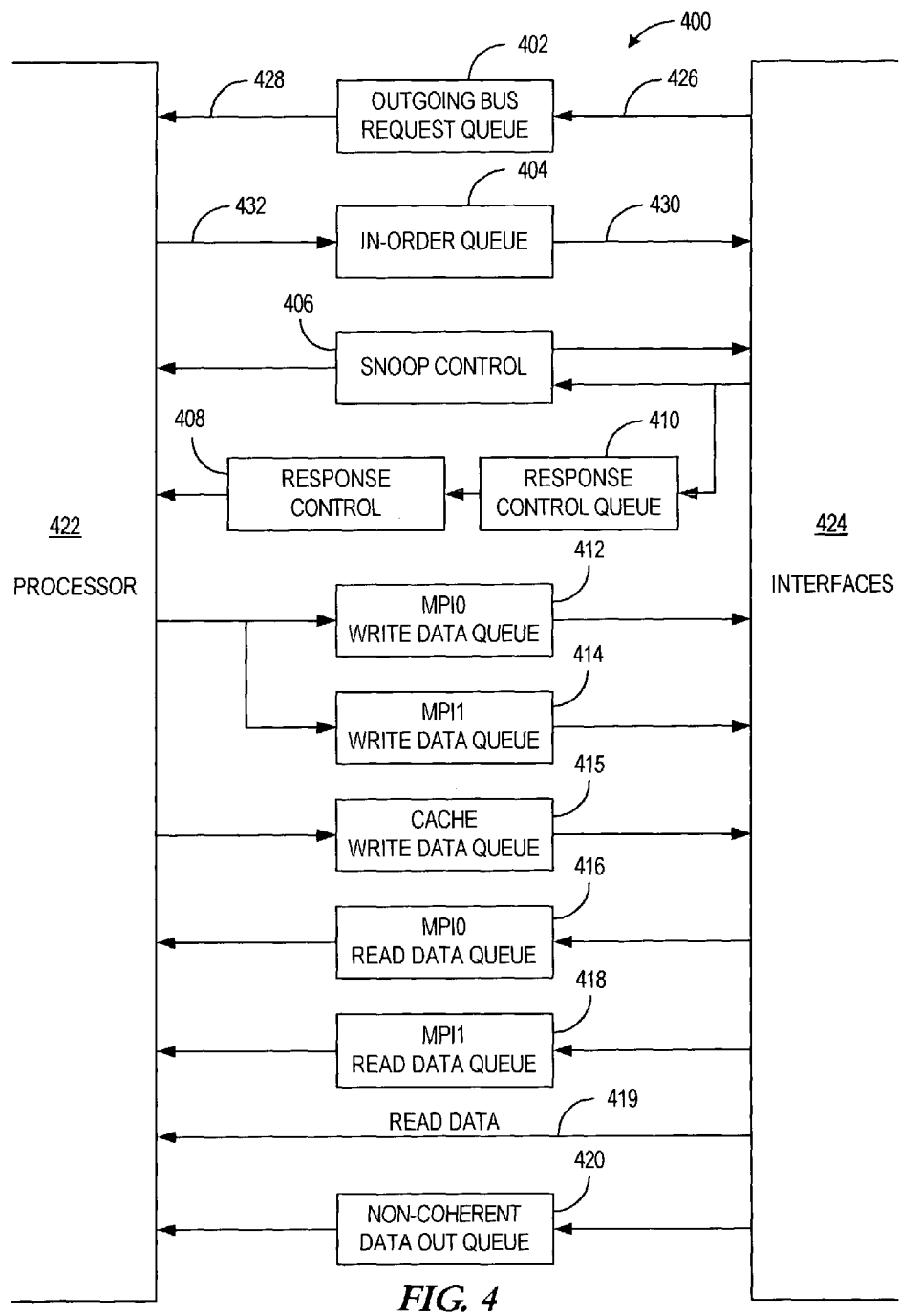
FIG. 4 illustrates a functional block diagram of the bus interface controller of FIG. 3.

FIG. 4 illustrates an exemplary functional block diagram 400 of Bus Interface Controller 302 as illustrated in FIG. 3. Processor 422 may represent one of many processors adapted to contemporaneously interface with other modules/interfaces 424 of the system, such as to the memory interface, cache interface, pipeline, etc. Generally speaking, there exist five phases of operation of Bus Interface Controller 302: 1.) Arbitration; 2.) Request; 3.) Snoop; 4.) Response; and 5.) Data. Arbitration phase operation of Bus Interface Controller 302 allows for one of Processors 422 to obtain control of Bus Interface 338, or alternatively to allow other interfaces 424 to obtain control of Bus Interface 338, during one or more bus clock cycles. Arbitration phase is entered when one of Processors 422 asserts a bus request signal or another interface 424 asserts the bus request signal. A number of agents may simultaneously arbitrate for the request bus, where Processors 422 represent symmetric agents and the other interfaces 424 represent priority agents. Owning the bus is a necessary pre-condition for initiating a transaction. The symmetric agents arbitrate for the bus based on a round-robin rotating priority scheme. Priority agent bus requests override symmetric agent bus requests, where the priority agent bus request is always the next bus owner. The response to the bus request signal is assertion of a bus priority signal to the requesting device having priority, thereby relinquishing control of the bus to either the symmetric agents or the priority agent. Bus blocking control may be asserted by any of the bus agents to block further transactions from being issued to the request bus, in such instances, for example, when system resources, such as address and data buffers, are about to become temporarily busy or filled and cannot accommodate another transaction.

The request phase of Bus Interface Controller 302 is entered when either Processors 422 or interface 424 modules have successfully arbitrated for bus control. With reference to both FIGS. 3 and 4, request signals may be provided by Transaction Pipeline 314, Memory Port Interface 330, and Memory Port interface 320 via interfaces 424, and bus request signals may be provided by Processor 422 in order to generate snoop requests. Assertion of an address strobe signal defines the beginning of the request transaction. An active low address is provided along with the address strobe signal as part of the request. The low three bits are mapped into byte enable signals to accommodate, for example, 0 through 8 byte transfers per clock cycle. Even parity is used to insure that an even number of active low signals exist throughout the entire request signal.

Outgoing Bus Request Queue 402 receives bus requests from one or more modules/interfaces 424 via interface 426 and provides the requests via Interface 428 to the addressed Processor 422 of the request. Likewise, In-Order Queue 404 receives bus requests from Processor 422 via interface 432 and provides the bus requests to the addressed recipient via bus 430. Each of Outgoing Bus Request Queue and In-Order Queue is limited, for example, to a depth of 8 and are responsible for queuing up requests from interfaces 424 and Processor 422, respectively. Handshake signals are used between Outgoing Bus Request Queue 402 and modules/interfaces 424 and also between In-Order Queue 404 and Processor 422 in order to throttle the number of requests received by each of Queues 402 and 404. Additional signaling is provided by Outgoing Bus Request Queue 402 when the queue has been filled to a predetermined depth. If, for example, the predetermined depth is 5 and the overall queue depth is 8, then 3 extra slots are provided in Outgoing Bus Request Queue 402 to allow for potential requests that may be waiting in Transaction Pipeline of FIG. 3. Each of Processors 422 monitors the In-Order Queue 404 and will stop sending requests when the queue is full.

Snoop phase operation is controlled through the combined operation of In-Order Queue 404 and Snoop Control 406 and is required to maintain cache coherency. With regard to FIGS. 2 and 3, Memory Port Interfaces 330 and 320 provide write and read access to, for example, Memory 208. Memory reads are cached into Cache 348 by Data Cache Interface 308, whereby subsequent access to the same memory space results in a memory read from Cache 348 instead of a memory read from Memory 208, resulting in a shorter memory access time. Memory 208, however, represents shared memory space to each Processor 422. Data read from Memory 208 and subsequently cached during one clock cycle from a first Processor 422 may be invalidated by a subsequent write to the same address in Memory 208 by a second Processor 422.

Snoop Control 406 is, therefore, used to provide snoop control of Cache 348 to Processors 422, while In-Order Queue 404 receives snoop requests from Processors 422. In operation, snoop signals from Snoop Control 406 allow Processors 422 to determine whether: 1.) an unmodified, requested cache line exists within Cache 348, resulting in a cache hit; 2.) a modified, requested cache line exists within Cache 348, resulting in a cache hit to a modified cache line; or 3.) no cache line exists within Cache 348, resulting in a cache miss. The snoop signals from Snoop Control 406 are used to maintain cache coherency at the system level and, therefore, provide an indication that the on-chip cache line within the snooping agent, e.g., Processor 422, is valid or invalid, whether the Cache 348 line is in a modified, or dirty, state or whether the transaction should be extended until such time that a valid snooping state may be determined.

The response phase of Bus Interface Controller 302 is controlled by Response Control Queue 410 and Response Control 408 and are responsive to requests received by In-Order Queue 404. A responding agent within the modules/interfaces 424 is responsible for processing requests at the top of In-Order Queue 404, where the responding agent is the agent being addressed by the request, e.g., Memory Port Interface 330 during a memory read of Memory 208 of FIG. 2 or alternately a memory read of Cache 348, if cached memory is present. Each response contains a response identifier, which is used to provide a response code to be placed on Bus Interface 338 during the response phase of Bus Interface Controller 302. The response code identifies, for example, a result of a bus snoop initiated by one of Processors 422. The results of the bus snoop may indicate, for example, that normal data was found, that no data was found, that the request is to be deferred, or that the request is to be retried. It should be noted that if the response code indicates that either a retry or deferral is necessary and that Snoop Control 406 indicates that Cache 348 is in a modified state, then the retry or defer response code will be implicitly changed to an automatic writeback from Memory 208 of FIG. 2, where Cache 348 will provide itself as a target to maintain data coherency between Cache 348 and Memory 208.

The data phase of Bus Interface Controller 302 operates to transfer data between Memory Port Interface 320 and related Memory Port Interface 0 Write Data Queue 412 and Memory Port Interface 0 Read Data Queue 416 and between Memory Port Interface 330 and related Memory Port Interface 1 Write Data Queue 414 and Memory Port Interface 1 Read Data Queue 418. Cache data may also be transferred from the Processor 422 to cache via the Cache Write Data Queue 415, and to the Processor as shown on path 419. Non-coherent Data Out Queue 420 operates to transfer data contained from local registers within interfaces 424 to Processors 422. A byte enable field may be used to enable multiple data bytes on the data bus per transfer cycle.

Data may be transferred in a data up direction from Processors 202 of FIG. 2 to Memory 208, or transferred from Memory 208 to Processors 202 in a data down direction. Data may be transferred in blocks, known as cache lines or cache blocks, using intermediary, non-blocking buffers. The buffers are said to be non-blocking because the cache lines may be stored anywhere within the buffers and the cache lines may be extracted from the buffers no matter what their position within the buffer. Such an arrangement is non-blocking because cache lines stored within the non-blocking buffer are not blocked by other cache lines stored within the buffer, as would be the case, for example, in a First-In, First-Out (FIFO) buffer arrangement. Such a non-blocking arrangement is an important feature of the present invention because cache lines are not transferred until they become valid and the rate of cache line validity varies from cache line to cache line. Accordingly, use of a blocking buffer would unnecessarily contribute to the delayed transmission of valid cache lines because cache lines having higher priority may not be in a valid state, thus blocking the transmission of lower priority cache lines that are in a valid state.

Figure 5:
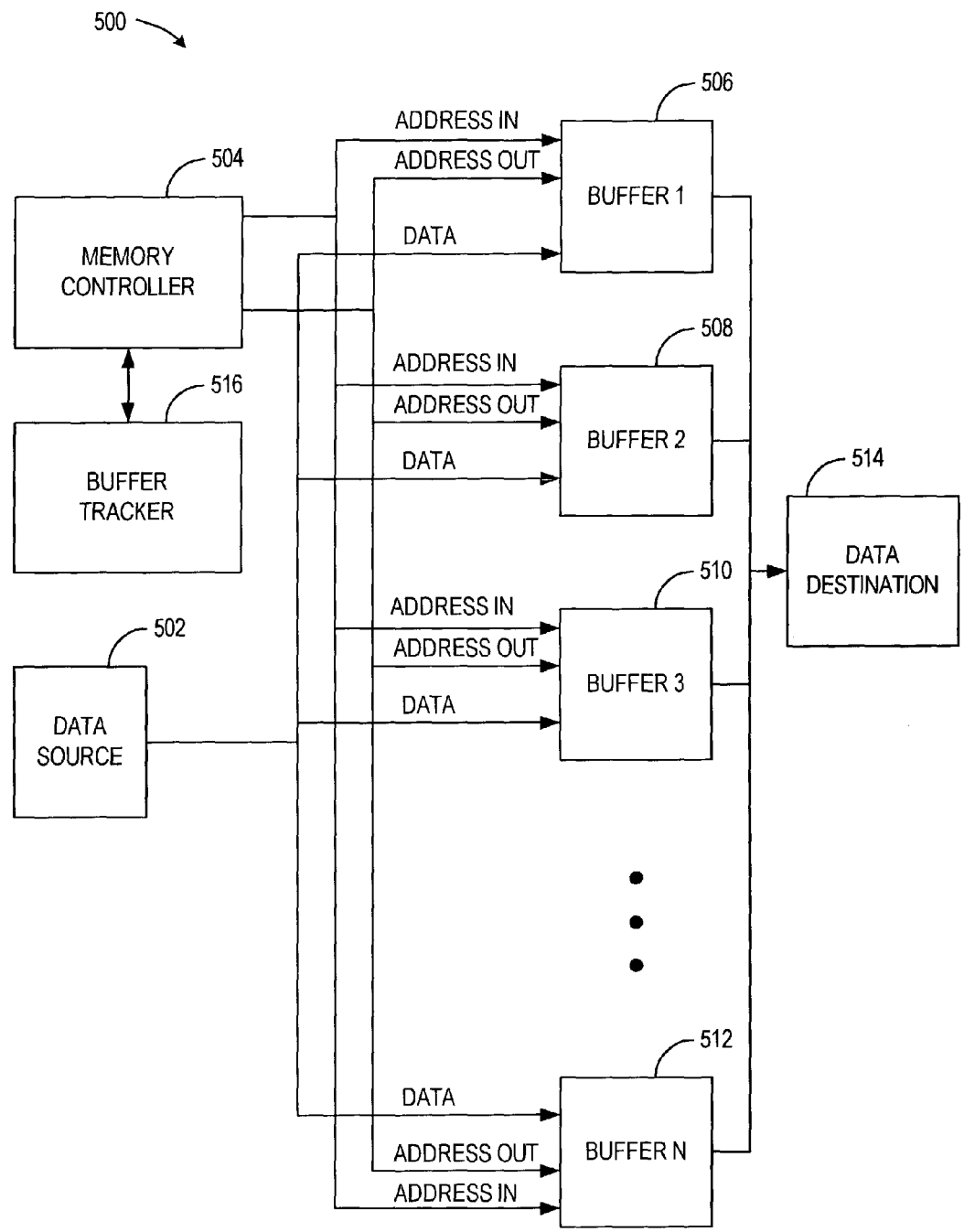
FIG. 5 illustrates a block diagram of a data controller according to the present invention.

FIG. 5 illustrates a block diagram of Data Controller 500 according to the present invention. Data Source 502 may represent a source of a cache line, whether it be from Processors 202 or Memory 208 of FIG. 2 and Data Destination 514 may represent the destination of the cache line, whether it be to Memory 208 or Processors 202, respectively. Memory Controller 504 provides Address In control to determine which storage location of Buffers 506–512 is to be used to temporarily store cache lines from Data Source 502. Separate Address Out control is used to determine from which storage location of Buffers 506–512 data is to be retrieved and subsequently supplied to Data Destination 514. Buffer Tracker 516 maintains the operational state of each storage location in each of Buffers 506–512. The capacity of Buffers 506–512 may be set, for example, to a 16 or 32 cache line depth, wherein a cache line may be inserted or retrieved from any of the 16 or 32 storage locations within Buffers 506–512 regardless of the state of storage locations existing in any of the other locations within Buffers 506–512. It should be noted that any number of storage locations may be allocated to Buffers 506–512 as required and the exemplary 16–32 cache line depth is set forth merely for illustration purposes only.

The state, or band, of each cache line contained within Buffers 506–512 is maintained by Buffer Tracker 516, where the band may assume any one of three assignments: active, valid, or deallocate. The initial assignment to a cache line, or equivalently to its corresponding storage location, is given when the cache line is to be allocated, or in other words, given a storage location within one of Buffers 506–512. Once a storage location within one of Buffers 506–512 has been allocated for a cache line, it is assigned to the active band by Buffer Tracker 516 meaning that the particular storage location may no longer be used, but that the data at that particular storage location is not yet valid. Once a cache line has been placed into the storage location, that particular storage location is assigned to the valid band by Buffer Tracker 516, meaning that the storage location has been allocated within one of Buffers 506–512 and that the storage location contains a valid cache line. Once the cache line is retrieved from the storage location, Buffer Tracker 516 deallocates the storage location and returns it to a pool from which the next required storage location is allocated.

It should be noted that Buffer Tracker 516 maintains the assignments of each storage location within Buffers 506–512 individually, such that three separate assignments may be maintained for each storage location at any given time, where storage location allocations are appropriated based on the individual assignments in accordance with a particular selection algorithm. If a storage location, for example, is in a deallocated stage, it is added to an allocation pool (not shown) within Buffer Tracker 516. The allocation pool is maintained by Buffer Tracker 516 to facilitate the selection of the next available storage location to be used for the next cache line storage. The storage locations are unavailable to the allocation pool if their respective assignment bands indicate either an allocated or a valid state. The individual assignment tracking mechanism of Buffer Tracker 516, therefore, allows cache lines to be allocated and deallocated in random order such that a non-blocking queue operation may be realized.

Figure 6:
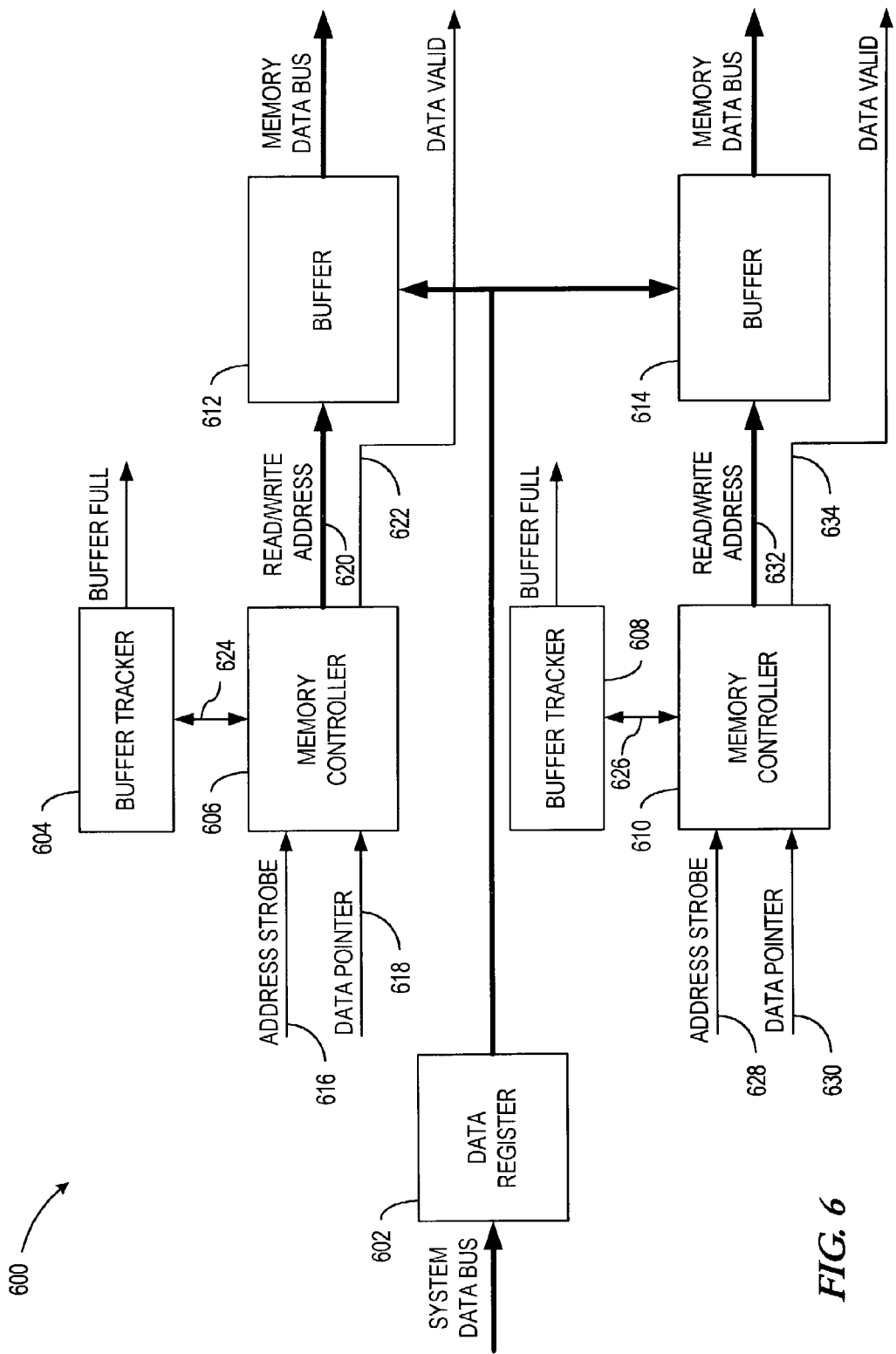
FIG. 6 illustrates a block diagram of a data up block diagram.

FIG. 6 illustrates an exemplary block diagram of Data Up Controller 600 according to the present invention. Data Up Controller 600 resides within Bus Interface Controller 302 of FIG. 3 and controls data transfer from Processors 202 of FIG. 2 to Memory 208 of FIG. 2 during the data phase of Bus Interface Controller 302. Data Register 602 is coupled to the data bus portion of Bus Interface 338 of FIG. 3 and latches data off of Bus Interface 338 when data meant for Memory 208 of FIG. 2 is valid and available. Buffer 612 and Buffer 614 receive the data from Data Register 602 as directed by Memory Controllers 606 and 610. Buffer Trackers 604 and 608 maintain control of the apportionment of cache lines within Buffer 612 and Buffer 614 during the snoop phase of Bus Interface Controller 302 of FIG. 3 in preparation for the data transfer to take place during the data phase of Bus Interface Controller 302 of FIG. 3. Buffer Trackers 604 and 608 work in combination with Transaction Pipeline 314 and Local/Remote Trackers 312 to allocate the buffer storage within Buffer 612 and Buffer 614 to accommodate the data transfer. The data storage, for example, may be allocated by Bus Interface Controller 302 of FIG. 3, where pointers to the allocated memory blocks are forwarded to Transaction Pipeline 314 of FIG. 3 and then on to Memory Port Interfaces 330 and 320 of FIG. 3. Once Memory Port Interface 330 and 320 are ready to receive streamed data from Buffer 612 or Buffer 614, respectively, Memory Port Interface 330 and 320 present the pointer received from Transaction Pipeline 314 of FIG. 3 to Memory Controller 606 and 610, respectively, as data pointer 618 or

630. A buffer pointer is then transferred from Buffer Tracker 604 and 608 and is used to calculate Read/Write Address 620 and Read/Write Address 632, within Buffer 612 or 614, respectively, as the starting address of the cache line to be transferred to Memory Port Interface 330 and 320 of FIG. 3.

Once stored, the cache lines may be retrieved in any order from Buffer 612 by Memory Port Interface 330 of FIG. 3, or alternatively, the cache lines may be retrieved in any order from Buffer 614 by Memory Port Interface 320 of FIG. 3. Further, only a portion of the cache line stored within Buffer 612 or Buffer 614 may be retrieved if, for example, a data hold is generated, which would ordinarily cause unnecessary delay during the data transfer. In this instance, for example, a data stream from Buffer 612 to Memory Port Interface 330 that is delayed may be temporarily postponed, while a data stream from Buffer 614 to Memory Port Interface 320 is allowed to complete. Once the data stream from Buffer 614 to Memory Port Interface 320 is completed, the temporarily postponed data stream from Buffer 612 to Memory Port Interface 330 may then be completed.

Interfaces 624 and 626 provides Buffer Tracker 604 and Buffer Tracker 608, respectively, the control conduit necessary to maintain the deallocate, allocate, and valid assignments as necessary for each cache line contained within Buffer 612 and Buffer 614. In the snoop phase, for example, Transaction Pipeline 314 of FIG. 3 may reserve a storage location within Buffer 612 or Buffer 614 using the allocate band assignment. Once allocated, the storage location is removed from the available storage location pool (not shown) maintained within Buffer Tracker 604 and 608.

During the data phase of Bus Interface Controller 302 of FIG. 3, a cache line is ready for transfer from one of Processors 202 of FIG. 2, to Memory 208 of FIG. 2. The cache line is first transferred into the storage location within Buffer 612 or Buffer 614 that was allocated during the snoop phase. Once the cache line is transferred to Buffer 612 or Buffer 614, the assignment band for the storage location is changed from the allocate state to the valid state by Buffer Tracker 604 or Buffer Tracker 608, respectively. The cache line is then ready for immediate extraction from Buffer 612 or Buffer 614 regardless of its position, thus making Buffer 612 and Buffer 614 behave as a non-blocking buffer. Once the cache line has been extracted from Buffer 612 or 614, the storage location used to store the cache line is assigned to the deallocate state and returned to the allocation pool (not shown) within Buffer Tracker 604 or 608 for subsequent reallocation.

Buffer Tracker 604 and 608 maintain a Buffer Full signal, which is used as a throttling mechanism to prevent future cache line write access to Buffer 612 or 614 when the allocation pool (not shown) indicates that no further storage locations are in a deallocate state. Once Buffer Full is activated by Buffer Tracker 604, for example, Buffer Tracker 608, in combination with Buffer 614, exclusively accommodates further data up transactions until such time that Buffer Tracker 604 deasserts its Buffer Full signal. It can be said, therefore, that Data Up Controller 600 provides a redundant data transfer system, such that when one data up path, including Memory Controller 606, Buffer Tracker 604, and Buffer 612, becomes busy, the second data up path, including Memory Controller 610, Buffer Tracker 608, and Buffer 614 may be used.

It should be noted that a separate Data Down Controller (not shown) exists to handle, for example, cache line transfers from Memory 208 of FIG. 2 to Processors 202 of FIG. 2. The details of the Data Down Controller are not illustrated, however, because the Data Down Controller substantially performs the same function as the Data Up Controller in similar fashion. That is to say, that Data Down Controller resides within Bus Interface Controller 302 of FIG. 3 and controls data transfer from Memory 208 of FIG. 2 to Processors 202 of FIG. 2 during the data phase of Bus Interface Controller 302. A data register is coupled to the data bus portion of Bus Interface 338 of FIG. 3 and latches data onto Bus Interface 338 when data meant for Processors 202 of FIG. 2 is valid and available, where non-blocking buffers provide the data to the data register. Buffer trackers maintain control of the apportionment of cache lines within the non-blocking buffers during the snoop phase of Bus Interface Controller 302 of FIG. 3 in preparation for the data transfer to take place during the data phase of Bus Interface Controller 302 of FIG. 3. The buffer trackers work in combination with Transaction Pipeline 314 and Local/Remote Trackers 312 to allocate the buffer storage within the non-blocking buffers to accommodate the data transfer.

Figure 7:
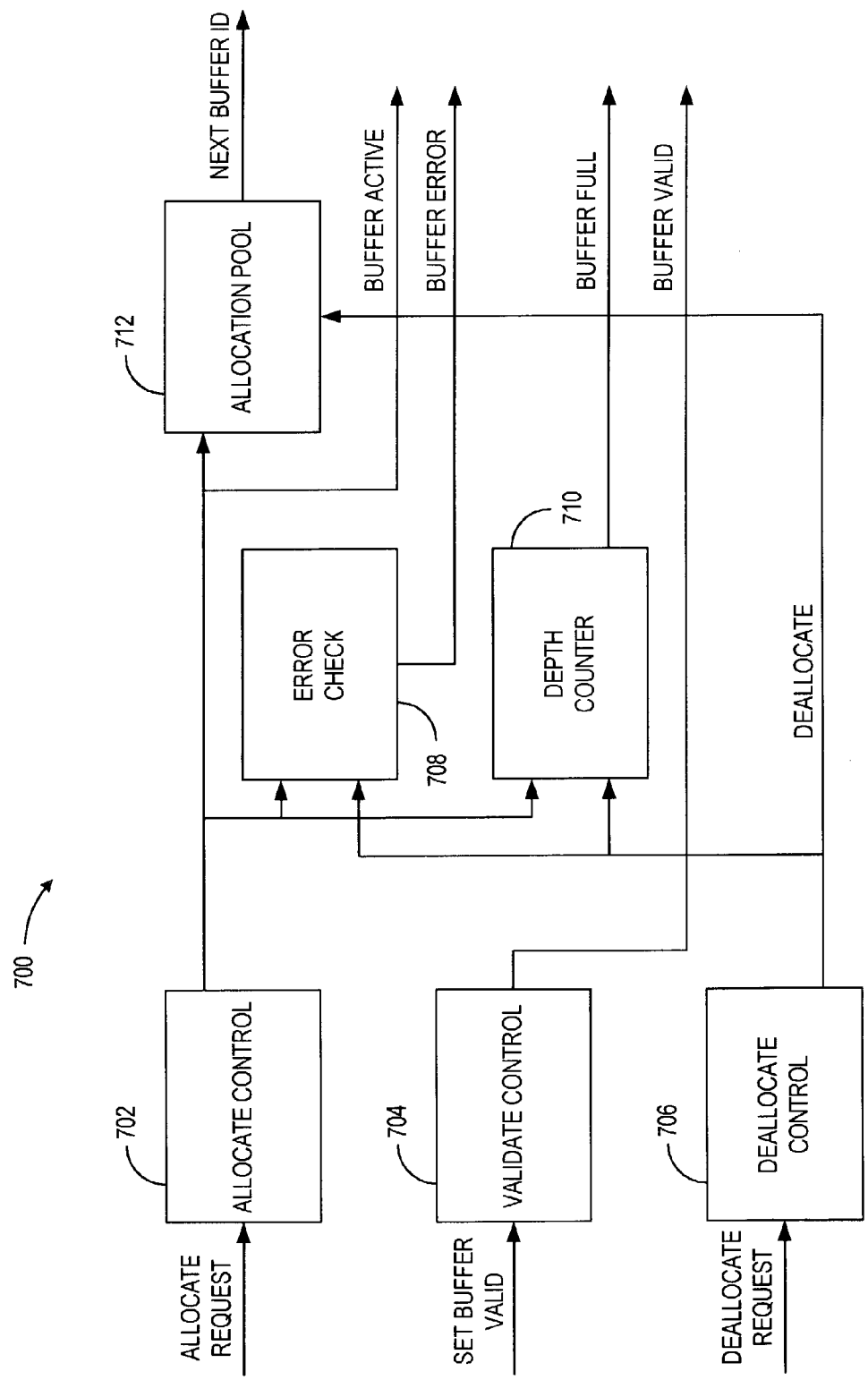
FIG. 7 illustrates a block diagram of the buffer tracker of FIG. 6.

FIG. 7 illustrates a block diagram of Buffer Tracker 700 according to the present invention. Allocate Control 702 receives signal Allocate Request and provides signal Buffer Active to Allocation Pool 712, Error Check 708, Depth Counter 710 and externally. Validate Control 704 receives signal Set Buffer Valid and provides signal Buffer Valid. Deallocate Control 706 receives signal Deallocate Request and provides signal Deallocate to Error Check 708, Depth Counter 710, and Allocation Pool 712. Depth Counter 710 receives signals Buffer Active and Deallocate and provides signal Buffer Full.

In operation, Buffer Tracker 700 maintains and controls band assignments to each individual storage location within its corresponding buffer. Buffer Tracker 700, for example, may be used to maintain and control band assignments for all storage locations contained within Buffer 612 or Buffer 614 of Data Up Controller 600. In addition, Buffer Tracker 700 may be used for the Data Down Controller (not shown) in substantially the same way as discussed for the Data Up Controller.

An allocate request may be received, for example, from Bus Interface Controller 302 during a data up transfer, or conversely, from Memory Port Interface 320 or 330 during a data down transfer. The Allocate Request signal is used to prepare a storage location within Buffer 612 or 614 in anticipation of its use during either data up or data down transfer, thus reducing the storage location to write only access. In response to the Allocate Request signal, Depth Counter 710 calculates the number of allocated storage locations remaining by subtracting the number of storage locations already allocated from the total number of storage allocations available in Buffer 612 or 614. If no more storage locations are available for allocation within Buffer 612, for example, Depth Counter 710 asserts signal Buffer Full to invoke the redundant operation of Data Up Controller 600 of FIG. 6 by allowing Buffer 614, for example, to accommodate the allocation request.

Allocation Pool 712 also receives signal Buffer Active in order to generate signal Next Buffer ID, which is a signal sent to Memory Controller 606 or 610 of FIG. 6 for use in selecting the next storage location to be used, where Allocation Pool 712 maintains a list of the available storage locations for allocation. That is to say, that Allocation Pool 712 tracks those storage locations within, for example, Buffer 612 that have not been allocated to any other cache line storage request. Since Buffer 612 and 614 are non-blocking buffers, each storage location within each Buffer 612 or 614 is individually tracked by Allocation Pool 712, such that the number of storage locations available for allocation is the number of storage locations whose assignment band is deallocate. Allocation Pool 712 generates signal Next Buffer ID to identify the address of the storage location to be used to store the next cache line within Buffer 612 or 614. Memory Controller 606 and 610 receives Next Buffer ID in order to generate the necessary Read/Write Address signal to retrieve/store the next cache line.

Once the cache line is available from Bus Interface 338 of FIG. 3 in data up mode, or available from Memory Data Bus 342 or 346 of FIG. 3 in data down mode, it is transferred into the storage location previously allocated and identified by signal Next Buffer ID. Once the transfer is complete, Set Buffer Valid signal is transferred by either Bus Interface Controller 302 of FIG. 3 in data up mode or by Memory Port Interface 320 or 330 of FIG. 3 in data down mode, and received by Validate Control 704, which is subsequently forwarded onto Memory Controller 606 and 610 of FIG. 6 to set the assignment band of the storage location within Buffer 612 or 614 of FIG. 6 to valid. The valid assignment band generates read only access rights for the storage location, thereby eliminating the possibility of overwriting the data just written, prior to reading it. Once the cache line is accessed from Buffer 612 or 614 of FIG. 6 during the data phase of Bus Interface Controller 302 of FIG. 3, signal Deallocate Request is transferred by either Bus Interface Controller 302 of FIG. 3 in data up mode or by Memory Port Interface 320 or 330 of FIG. 3 in data down mode, and received by Deallocate Control 706, which in turn provides signal Deallocate to Error Check 708, Depth Counter 710, and Allocation Pool 712. Allocation Pool 712, then adds the storage location identified by signal Deallocate back into the available storage location pool for future allocation. Similarly, Depth Counter 710 increments the total number of storage locations available within Buffer 612 or 614, thus increasing the available capacity of Buffer 612 or 614.

Error Check 708 receives signals Buffer Active and Deallocate. Once a Buffer Active signal is received for a particular storage location, Error Check 708 determines whether the last signal received for that particular storage location was a Buffer Active signal or a Deallocate signal. If a Buffer Active signal was received, error signal Buffer Error is generated denoting that two consecutive Buffer Active signals have been received for the same storage location. Conversely, once a Deallocate signal is received for a particular storage location, Error Check 708 determines whether the last signal received for that particular storage location was a Deallocate signal or a Buffer Active signal. If a Deallocate signal was received, error signal Buffer Error is generated denoting that two consecutive Deallocate signals have been received for the same storage location. Error Check 708, in other words, verifies that each storage location of Buffers 612 and 614 of FIG. 6 are toggled back and forth between active and deallocate assignment bands to insure that a particular storage location is not allocated or deallocated more than once before it transitions to the opposite assignment band.

Figure 8:
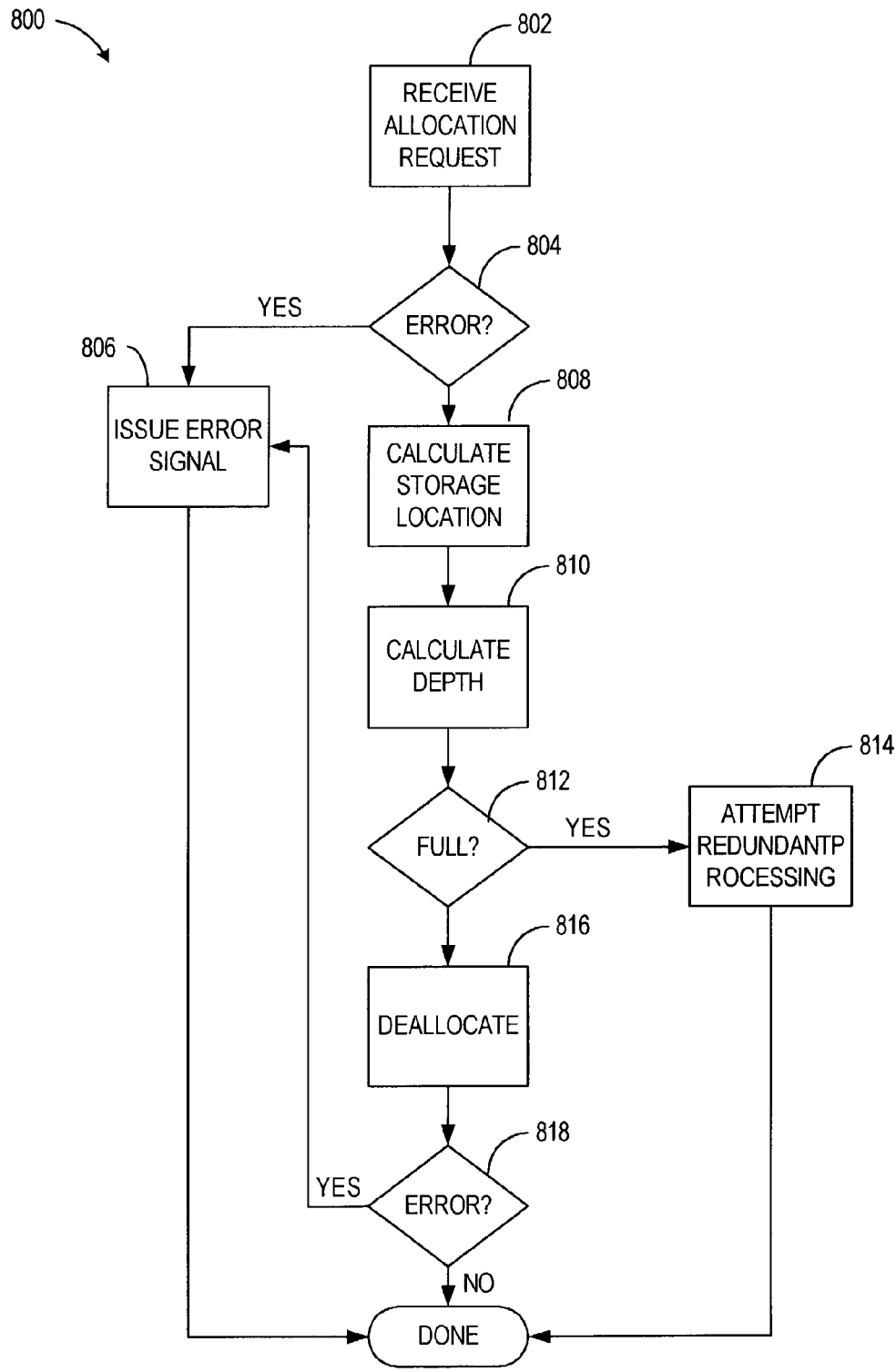
FIG. 8 illustrates a flow diagram of assignment band processing according to the present invention.

FIG. 8 illustrates a flow chart presenting exemplary assignment band processing according to the present invention. An allocation request is received at step 802 during, for example, a snoop phase of Bus Interface Controller 302 of FIG. 3. The allocation request for a particular storage location is compared in step 804 to any other allocation requests that may have been received for that same storage location. If the two allocation requests exist sequentially, with no deallocation request in between for that storage location, an error signal is issued in step 806 and then the operation completes. The storage location to be used during the next cache line storage is calculated in step 808, based on an algorithm which sorts through an allocation pool containing both allocated and deallocated storage location pointers.

A depth calculation is then performed in step 810, which calculates the remaining number of storage locations within a particular non-blocking buffer based on the total number of storage locations contained within the buffer as compared to the number of allocated storage locations contained within the buffer. If the buffer is calculated to be full as in step 812, or if the buffer is near full such that the next transaction will overflow, then redundant processing is attempted in step 814 with the remaining paired buffer. For example, if Buffer 612 of FIG. 6 is full or near full, then redundant processing may divert to Buffer 614 of FIG. 6 to handle the cache line allocation request. Once the cache line has been retrieved from the non-blocking buffer, the storage location used for the cache line may be deallocated in step 816 and added back to the allocation pool to provide a future resource. The deallocation request for a particular storage location is compared in step 818 to any other deallocation requests that may have been received for that same storage location. If the two deallocation requests exist sequentially, with no allocation request in between for that storage location, an error signal is issued in step 806 and the operation completes.

In conclusion, a method and apparatus has been presented that allows for non-blocking data transfer operation to increase efficiency of operation. Since data required by one processor or memory unit is not blocked by data required by another processor or memory unit, data stalls caused by blocking buffers is substantially eliminated.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for controlling data block transfers, comprising:
    maintaining a pool of available storage locations within a buffer;
    allocating a storage location from the pool in response to a pending request for transfer of a data block, wherein allocating includes designating the allocated storage location to be in a first state that indicates that the allocated storage location is unavailable for subsequent allocation and contains invalid data;
    transferring the data block into the allocated storage location, wherein transferring includes designating the allocated storage location to be in a second state that indicates that the allocated storage location is unavailable for subsequent allocation and contains valid data; and
    retrieving the data block from the allocated storage location, wherein retrieving the data block is independent of an order in which other storage locations within the buffer are allocated.

2. The method according to claim 1, wherein retrieving the data block includes
    returning an allocated storage location to the pool of available storage locations once a data block is retrieved from the allocated storage location and designating the returned storage location to be in a third state that indicates that the returned storage location is available for subsequent allocation and contains invalid data.

3. The method according to claim 1, wherein a first control signal is used to determine the allocated storage location used to receive the transferred data block.

4. The method according to claim 1, wherein a second control signal is used to determine the allocated storage location from which the data block is retrieved.

5. A multiprocessor system, comprising:
- a plurality of multiprocessors sharing a common system bus with access to a common memory pool; and
- a node controller coupled to each of the plurality of multiprocessors, wherein the node controller includes,
  - a plurality of buffers coupled to receive data blocks and coupled to provide the data blocks independently of a position of the data blocks within the plurality of buffers; and
  - a buffer tracker coupled to the plurality of buffers to control data block transfer according to assignment bands associated with the data blocks, wherein the buffer tracker includes,
    - an allocation controller coupled to receive an allocation request for a storage location within the plurality of buffers and coupled to provide a first assignment band to the storage location in response to the allocation request; and
    - a deallocation controller coupled to receive a deallocation request for the storage location within the plurality of buffers and coupled to provide a second assignment band to the storage location in response to the deallocation request.

6. The multiprocessor system according to claim 5, wherein the plurality of buffers comprises:
- a first set of buffers used to facilitate data transfer from the multiprocessors to the common memory pool; and
- a second set of buffers used to facilitate data transfer from the common memory pool to the multiprocessors.

7. The multiprocessor system according to claim 5, wherein the buffer tracker further comprises an allocation pool coupled to receive the first and second assignment bands to maintain a list of available storage locations.

8. The multiprocessor system according to claim 7, wherein the allocation pool removes the storage location associated with the first assignment band from the list of available storage locations in response to receiving the first assignment band.

9. The multiprocessor system according to claim 7, wherein the allocation pool adds the storage location associated with the second assignment band to the list of available storage locations in response to receiving the second assignment band.

10. The multiprocessor system according to claim 5, wherein the buffer tracker further comprises a depth counter coupled to receive the first and second assignment bands to monitor a capacity level of the plurality of buffers and coupled to provide a signal indicative of a zero capacity level of the plurality of buffers.

11. The multiprocessor system according to claim 10, wherein the depth counter decrements the capacity level in response to receiving the first assignment band.

12. The multiprocessor system according to claim 10, wherein the depth counter increments the capacity level in response to receiving the second assignment band.

13. The multiprocessor system according to claim 5, wherein the buffer tracker further comprises an error checker coupled to receive the first and second assignment bands, wherein an error signal is provided in response to a duplicate band assignment to the same storage location.

14. A method of maintaining an assignment band of a data block within a buffer to control access to the data block, the method comprising:
- establishing a first assignment band for the data block in response to receiving an allocation request;
- establishing a second assignment band for the data block when data is written to the data block in accordance with a first data pointer; and
- establishing a third assignment band for the data block when data is read from the data block in accordance with a second data pointer.

15. The method according to claim 14, wherein the first assignment band reserves the data block for write only access.

16. The method according to claim 15, wherein the second assignment band reserves the data block for read only access.

17. The method according to claim 14, wherein the third assignment band makes the data block available for reallocation to write only access.

* * * * *